US008003182B2

(12) United States Patent
Harruff

(10) Patent No.: US 8,003,182 B2
(45) Date of Patent: Aug. 23, 2011

(54) CUSTOMIZABLE CONTAINER IDENTIFICATION DEVICE

(76) Inventor: David Harruff, Redmond, WA (US)

( * ) Notice: Subject to any disclaimer, the term of this patent is extended or adjusted under 35 U.S.C. 154(b) by 544 days.

(21) Appl. No.: 12/177,400

(22) Filed: Jul. 22, 2008

(65) Prior Publication Data

US 2009/0029085 A1 Jan. 29, 2009

Related U.S. Application Data

(63) Continuation-in-part of application No. 11/829,717, filed on Jul. 27, 2007.

(51) Int. Cl.
*B32B 9/00* (2006.01)
*B32B 33/00* (2006.01)

(52) U.S. Cl. .................. 428/40.1; 428/41.7; 428/195.1; 428/201; 428/202; 428/908.8; 428/913.3; 428/914

(58) Field of Classification Search ................ 428/40.1, 428/41.7, 195.1, 201, 202, 908.8, 913.3, 428/914

See application file for complete search history.

(56) References Cited

U.S. PATENT DOCUMENTS 1,783,442 A * 12/1930 Mayer et al. .................. 428/486
2,648,924 A 8/1953 Brewster
3,123,384 A 3/1964 Baker
4,121,856 A 10/1978 Brunette
4,276,334 A 6/1981 Sugihara
4,444,329 A 4/1984 Vollers
4,583,765 A 4/1986 Messinger
4,720,479 A * 1/1988 Craig et al. .................. 503/200
4,971,364 A 11/1990 Templet
4,983,438 A 1/1991 Jameson
5,352,648 A 10/1994 Chao
5,492,077 A 2/1996 Rose
5,704,144 A 1/1998 Groth
6,053,349 A 4/2000 Griggs, Jr.
6,086,702 A 7/2000 Rea
6,136,129 A 10/2000 Petkovsek
6,196,593 B1 3/2001 Petrick
6,244,456 B1 6/2001 Hanlon
6,343,695 B1 2/2002 Petrick
6,576,315 B2 6/2003 Treleaven
6,676,794 B1 1/2004 Petkovsek
6,745,505 B2 6/2004 Moran
2003/0157279 A1 8/2003 Rudish
2003/0226298 A1 12/2003 Bjork
2003/0230019 A1 12/2003 Olivera
2004/0045855 A1 3/2004 Shrader
2004/0068900 A1 4/2004 Moran
2004/0128877 A1 7/2004 Luedde (Continued)

OTHER PUBLICATIONS

Extended European Search Report mailed Mar. 10, 2010, issued in corresponding European Application No. EP 08 252 531, filed Jul. 27, 2008, 6 pages.

*Primary Examiner* — Betelhem Shewareged
(74) *Attorney, Agent, or Firm* — Christensen O'Connor Johnson Kindness PLLC

(57) ABSTRACT

The present disclosure provides a container identification device including a protective top layer having a top surface and a bottom surface, and a marking layer secured to the bottom surface of the protective top layer, wherein a mark is made on the marking layer when a corresponding impression is made on the protective top layer. The container identification device further includes an adhesive layer secured to the marking layer.

11 Claims, 9 Drawing Sheets

U.S. PATENT DOCUMENTS

| | | | |
|---|---|---|---|
| 2004/0129377 | A1 | 7/2004 | Felder |
| 2004/0129712 | A1 | 7/2004 | Egan |
| 2005/0138854 | A1 | 6/2005 | Simmons |
| 2005/0196493 | A1 | 9/2005 | Singer |
| 2005/0229449 | A1 | 10/2005 | Shepley |
| 2005/0235532 | A1 | 10/2005 | Eberl |
| 2005/0238855 | A1 | 10/2005 | Gerace |
| 2005/0274053 | A1 | 12/2005 | Wolf |
| 2006/0107563 | A1 | 5/2006 | Farmsworth |
| 2006/0123605 | A1 | 6/2006 | Adair |
| 2006/0231445 | A1 | 10/2006 | Watson |
| 2006/0283059 | A1 | 12/2006 | Cope |
| 2008/0023363 | A1 | 1/2008 | Valadez |

* cited by examiner

CUSTOMIZABLE CONTAINER IDENTIFICATION DEVICE

CROSS-REFERENCE TO RELATED APPLICATION

This application is a continuation in part of U.S. patent application Ser. No. 11/829,717, filed on Jul. 27, 2007, the disclosure of which is hereby expressly incorporated by reference, priority of the filing date of which is hereby claimed under 35 U.S.C. §120.

BACKGROUND

Bottled water often goes to waste because a person sets the bottle down after partial consumption, and thereafter forgets which bottle is his or hers. This is also true for soda bottles, canned beverages, or other types of containers. With increased awareness of global warming and the push to "go green", it is desirous to reuse and recycle materials as much as possible. To alleviate confusion and prevent waste, a marking can be made on the bottle to differentiate the container from other similar containers. A writing utensil such as a marker or pen can be used to mark the bottle; however, a pen or marker is often unavailable. Similarly, a tag, sticker, sleeve, etc. may also be used to identify the owner of the bottle; however, the tag, sticker, or sleeve must often be marked with a pen, marker, etc. to provide identification.

Thus, it is desired to have a container identification device that is secured to the container when it reaches the consumer or is easily attachable thereto, wherein the container identification device can be used to uniquely identify the container without the use of a writing utensil.

SUMMARY

The present disclosure provides a container identification device including a protective top layer having a top surface and a bottom surface, and a marking layer secured beneath the protective top layer, wherein a mark is made on the marking layer when a corresponding impression is made on the protective top layer. The container identification device further includes an adhesive layer secured beneath the marking layer.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated by reference to the following detailed description, when taken in conjunction with the accompanying drawings, wherein:

DETAILED DESCRIPTION

Figure 1:
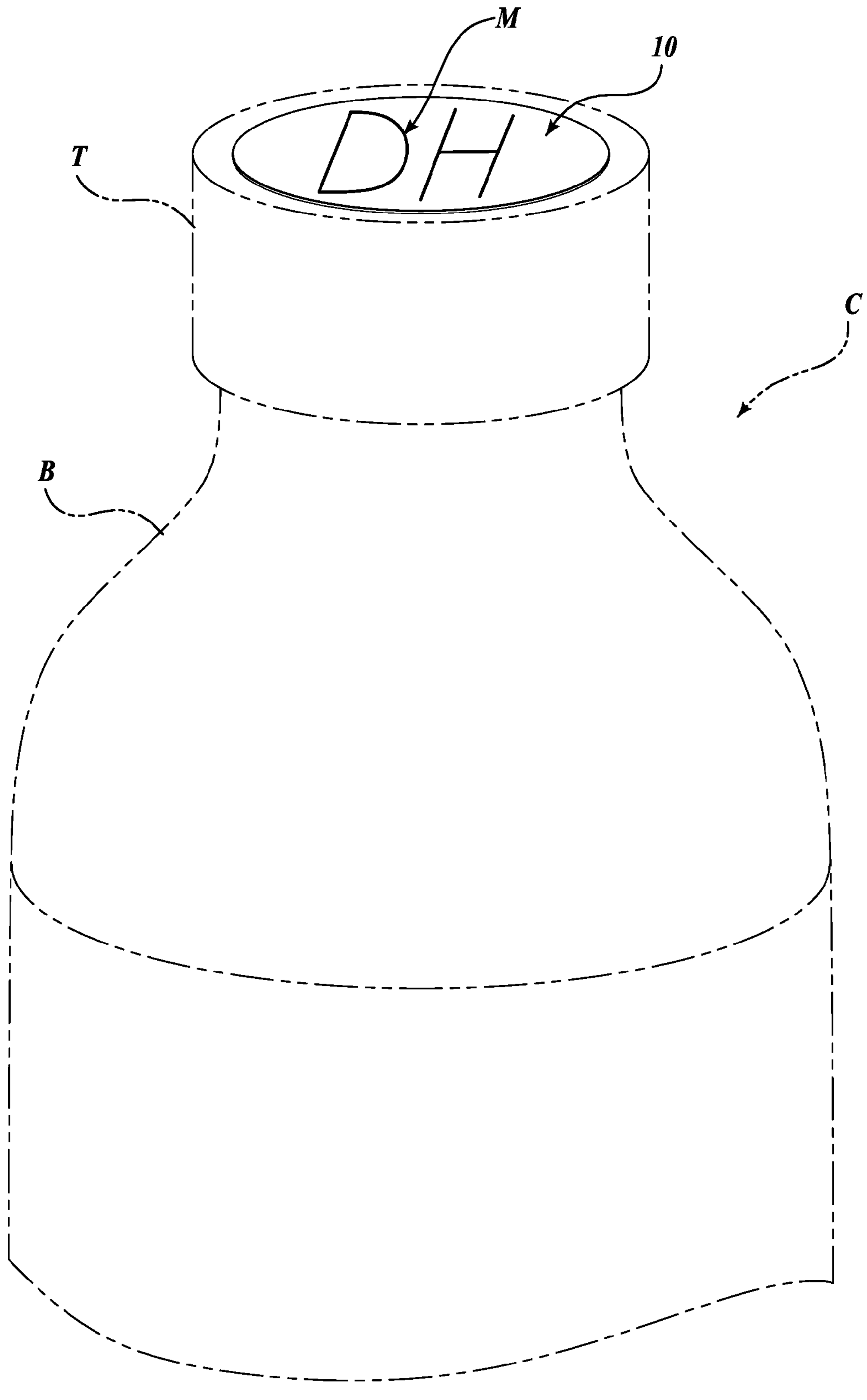
FIG. 1 is an environmental view of one suitable embodiment of a container identification device constructed in accordance with aspects of the present disclosure, wherein the container identification device is shown secured to a container.

A container identification device 10 will now be described with reference to FIGS. 1-5 where like numerals correspond to like elements. Referring to FIG. 1, the container identification device 10 is shown in use with a container C having a body B and a cap or top T, such as a disposable bottle of water. It should be appreciated that the container identification device 10 may be used on any suitable container or other storage device to uniquely identify the owner of the container, the contents therewithin, etc. Accordingly, the following descriptions and illustrations herein should be considered illustrative in nature, and thus, not limiting the scope of the present disclosure.

FIG. 1 illustrates one exemplary embodiment of a container identification device 10 secured to a container C for identifying the container C. The container identification device 10 is shown secured to the top T of the container C; however, the container identification device 10 may instead be secured to other portions of the container C, such as the body B. The container identification device 10 is used to form a unique, customized marking M on the container C to differentiate the container C from other like containers.

Figure 2:
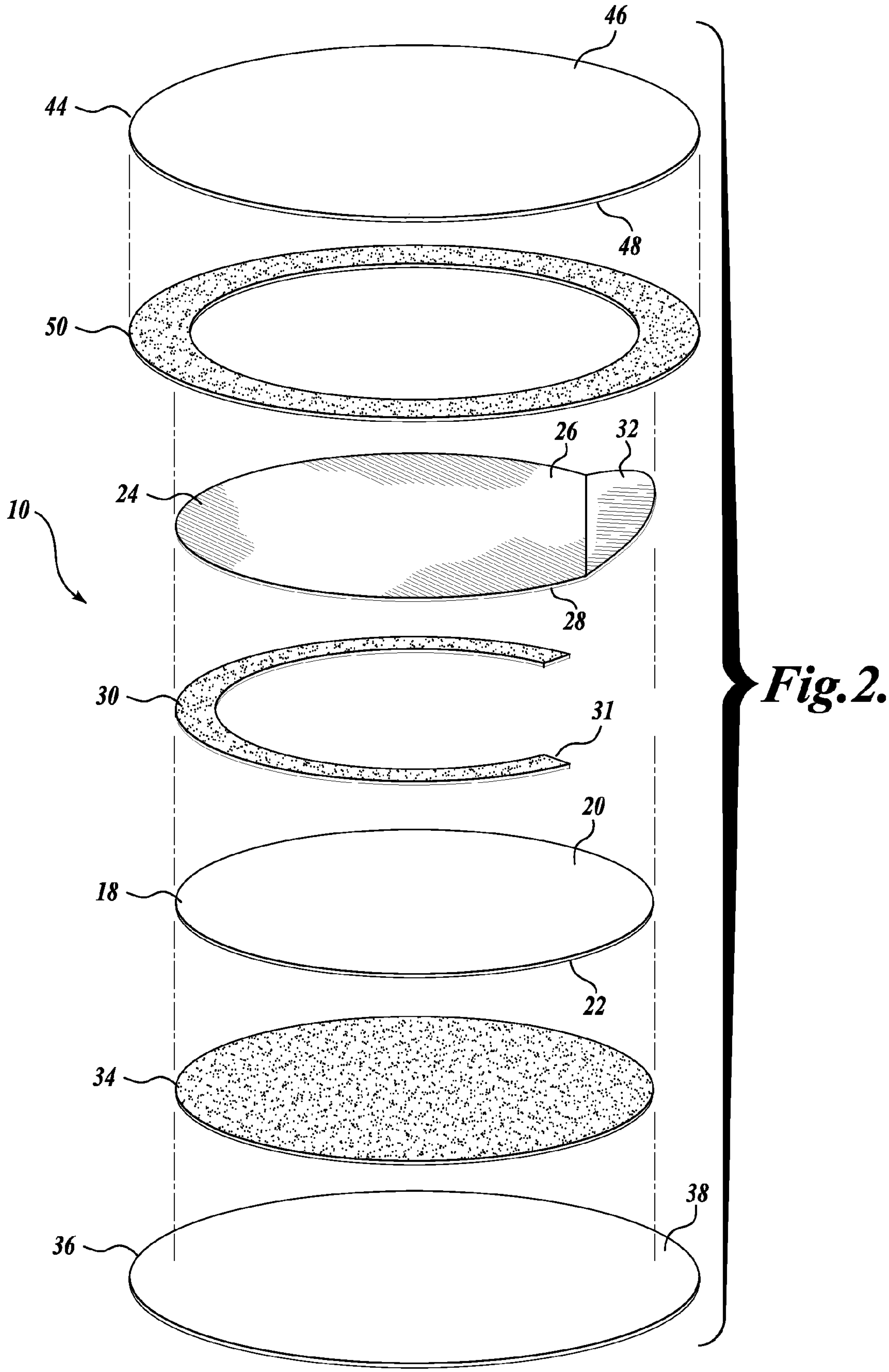
FIG. 2 is an exploded view of the container identification device of FIG. 1.
Figure 3:
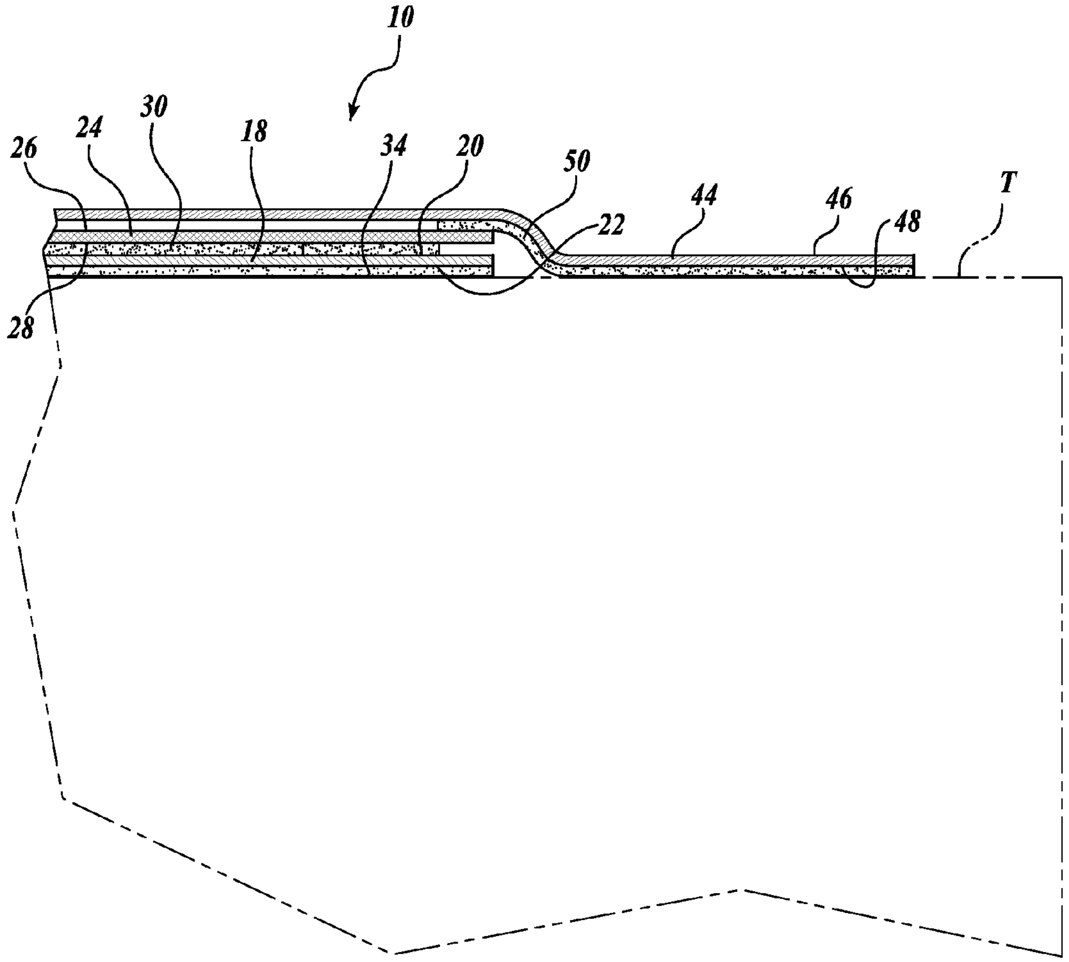
FIG. 3 is a partial cross-sectional view of the container identification device of FIG. 2, wherein the container identification device is shown assembled.

Referring to FIGS. 2 and 3, the container identification device 10 is comprised of a plurality of layers secured together to cooperatively define the container identification device 10. Preferably, each layer is substantially circular and sized to fit on the top T of the container C; however, other shapes and sizes may also be appreciated.

The container identification device 10 includes a primary layer 18 having a top surface 20 and a bottom surface 22, and a secondary layer 24 having a top surface 26 and a bottom surface 28. The primary layer 18 is positioned beneath and engages the secondary layer 24. The primary layer 18 and secondary layer 24 cooperatively form a two-sheet carbonless transfer system. The carbonless transfer system uses a carbonless paper technology to create a marking on the primary layer top surface 20. For instance, the bottom surface 28 of the secondary layer 24 may be coated with a micro-encapsulate dye or ink, and the top surface 20 of the primary layer 18 may be coated with a reactive clay, as are well known in the art. When an impression is made on the top surface 26 of the secondary layer 24 with a rigid instrument, the pressure from the rigid instrument causes the clay to react with the dye to form a permanent mark on the top surface 20 of the primary layer 18.

In the alternative, the primary layer 18 may simply be a sheet of plain paper, and the bottom surface 28 of the secondary layer 24 may be coated with both dye and reactive clay. As yet another alternative, the primary layer top surface 20 may include both the dye and reactive clay, and the secondary layer 24 may be a sheet of plain paper. Using either alternative, an impression is made on the top surface 26 of the secondary layer 24, and the pressure from the rigid instrument causes the clay to react with the dye. With the top surface 20 of the of the primary layer 18 engaging the bottom surface 28 of the secondary layer 24, a permanent mark is formed on the top surface 20 of the primary layer 18. It should be appreciated that any other suitable transfer technology may be used without departing from the sprit and scope of the present disclosure.

The secondary layer 24 is temporarily securable to the primary layer 18 through a first intermediate adhesive layer 30 applied to the bottom surface 28 of the secondary layer 24. The adhesive may be any suitable low-tack, pressure-sensitive, temporary adhesive, such as an adhesive containing rubber, acrylic, etc. The first intermediate adhesive layer 30 may be applied to the bottom surface 28 of the secondary layer 24 in any suitable manner, such as by calendaring, coating, etc.

The first intermediate adhesive layer 30 does not cover the entire bottom surface 28 of the secondary layer 24 such that the adhesive layer 30 does not preclude the carbonless transfer between the secondary layer 24 and the primary layer 18. As shown in FIG. 2, the first intermediate adhesive layer 30 is applied only around the perimeter of the secondary layer bottom surface 28, leaving an opening in the middle such that the bottom surface 28 of the secondary layer 24 is engageable with the top surface of the primary layer 18. Moreover, a gap 31 may be formed in the first intermediate adhesive layer 30 along a portion of the perimeter of the secondary layer 24 such that an edge portion of the secondary layer 24 is not adhesively secured to the primary layer 18. In the current embodiment, the secondary layer 24 includes a tab portion 32 disposed generally over the gap 31 such that a user may easily pull the tab 32 to peel the secondary layer 24 from the primary layer 18.

Referring to FIG. 2, the primary layer 18 includes an adhesive base layer 34 applied to its bottom surface 22 for securing the container identification device 10 to a container C when ready for use (see FIG. 3). The adhesive base layer 34 is preferably a permanent, pressure sensitive, low tack conventional adhesive that permanently secures two materials together, such as epoxy, polyurethane, neoprene, nitrile, and silicone. The adhesive base layer 34 is preferably formed on the entire bottom surface 22 of the primary layer 18, however, the adhesive base layer 34 may instead be formed on only a portion thereof. The adhesive base layer 34 may have an adequate shear strength and moisture resistance such that the primary layer 18 permanently adheres to the container C, even if the container C is wet (for example, if it is being stored within a cooler having ice). In the alternative, the adhesive base layer 34 may consist only of a satisfactory amount of adhesive such that the adhesive provides adequate shear strength to prevent the primary layer 18 from easily separating from the container C. The adhesive base layer 34 may be applied to the bottom surface 22 of the primary layer 18 in any suitable manner, such as by calendaring, coating, etc.

A protective peelable backing 36 having a top surface 38 may be temporarily secured to the adhesive base layer 34 to protect the adhesive base layer 34 from dirt or moisture prior to application. The peelable backing 36 includes a release coating, such as silicon or wax, on its top surface 38 that permits the primary layer 18 having the permanent adhesive base layer 34 thereon to be removable from the top surface 38 of the backing 36.

The peelable backing 36 is preferably slightly larger than the remaining layers of the container identification device 10 such that the peelable backing 36 may be easily peeled away from the remaining layers when the container identification device 10 is ready to be used. The peelable backing 36 may be sized such that the container identification device 10 can be individually distributed to consumers separately from the container C. In the alternative, the peelable backing 36 may instead be a sheet or strip that temporarily holds a plurality of container identification devices 10 thereon. In this manner, a large number of container identification devices 10 can be sent, for instance, to the container manufacturer such that the container identification devices 10 can be secured to the container C prior to its shipment to the consumer or retailer.

The container identification device 10 optionally includes a removable protective top layer 44 having a top surface 46 and a bottom surface 48. The protective top layer 44 is preferably formed with a water-proof or water-resistant material, such as plastic. The protective top layer 44 is adapted to engage the secondary layer 24, but it is also sufficiently large such that an edge portion of the protective top layer 44 additionally engages the peelable backing 36 (see FIG. 2) or the top T of the container C (see FIG. 3). With the identification device 10 secured to the top T, the primary and secondary layers 18 and 24 and the adhesive layers 30 and 34 are sealed beneath the protective layer 44 and are protected from water damage or other damage.

The protective top layer 44 is releasably secured to the secondary layer 24 and peelable backing 36 (or top T) through a second intermediate adhesive layer 50 secured to the bottom surface 48 of the protective top layer 44. The adhesive may be any suitable low-tack, pressure-sensitive, temporary adhesive, and may be applied to the bottom surface 48 of the protective top layer 44 in any suitable manner.

The second intermediate adhesive layer 50 is preferably applied around the perimeter of the protective top layer bottom surface 48, leaving an opening in the middle such that the bottom surface 48 of the protective top layer 44 is engageable with the top surface of the secondary layer 24. As such, an impression can be made on the top surface 46 of the protective top layer 44 with a rigid instrument, thereby making an impression on the top surface 26 of the secondary layer 24 to form a permanent mark on the top surface 20 of the primary layer 18. In the alternative, if the primary layer top surface 20 includes both the dye and reactive clay (as discussed above) the secondary layer 24 may be eliminated and the protective layer 44 may instead adhere directly to the primary layer 18. The protective top layer 44 and the secondary layer 24 are preferably peelable from the remaining layers at the same time. In the alternative, the protective top layer 44 can be first peeled away from the secondary layer 24, as shown in FIG. 4, such that an impression may be made directly on the top surface 26 of the secondary layer 24.

In use, the container identification device 10 is first secured to the container C either by the consumer or at the container manufacturer prior to its shipment to the retailer or consumer. To secure the container identification device 10 to the container C, the peelable backing 36 is peeled away from the primary layer 18 to reveal the adhesive base layer 34 on the bottom surface 22 of the primary layer 18. The container identification device 10 is then secured to the container C in any suitable location, such as on the top T, through the adhesive base layer 34 (see FIG. 3).

Figure 4:
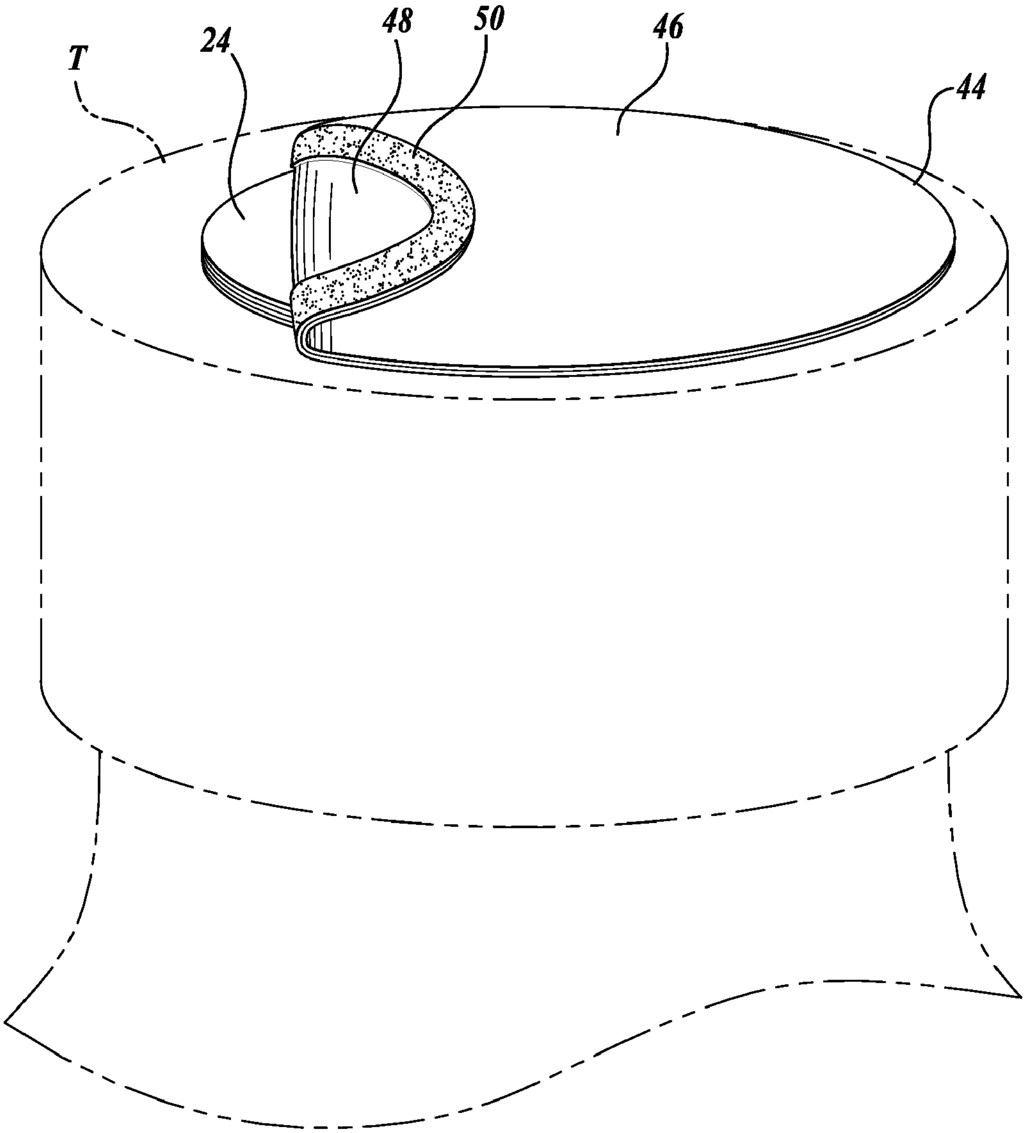
FIG. 4 is an isometric view of the container identification device of FIG. 1, wherein a portion of the container identification device is partially removed.
Figure 5:
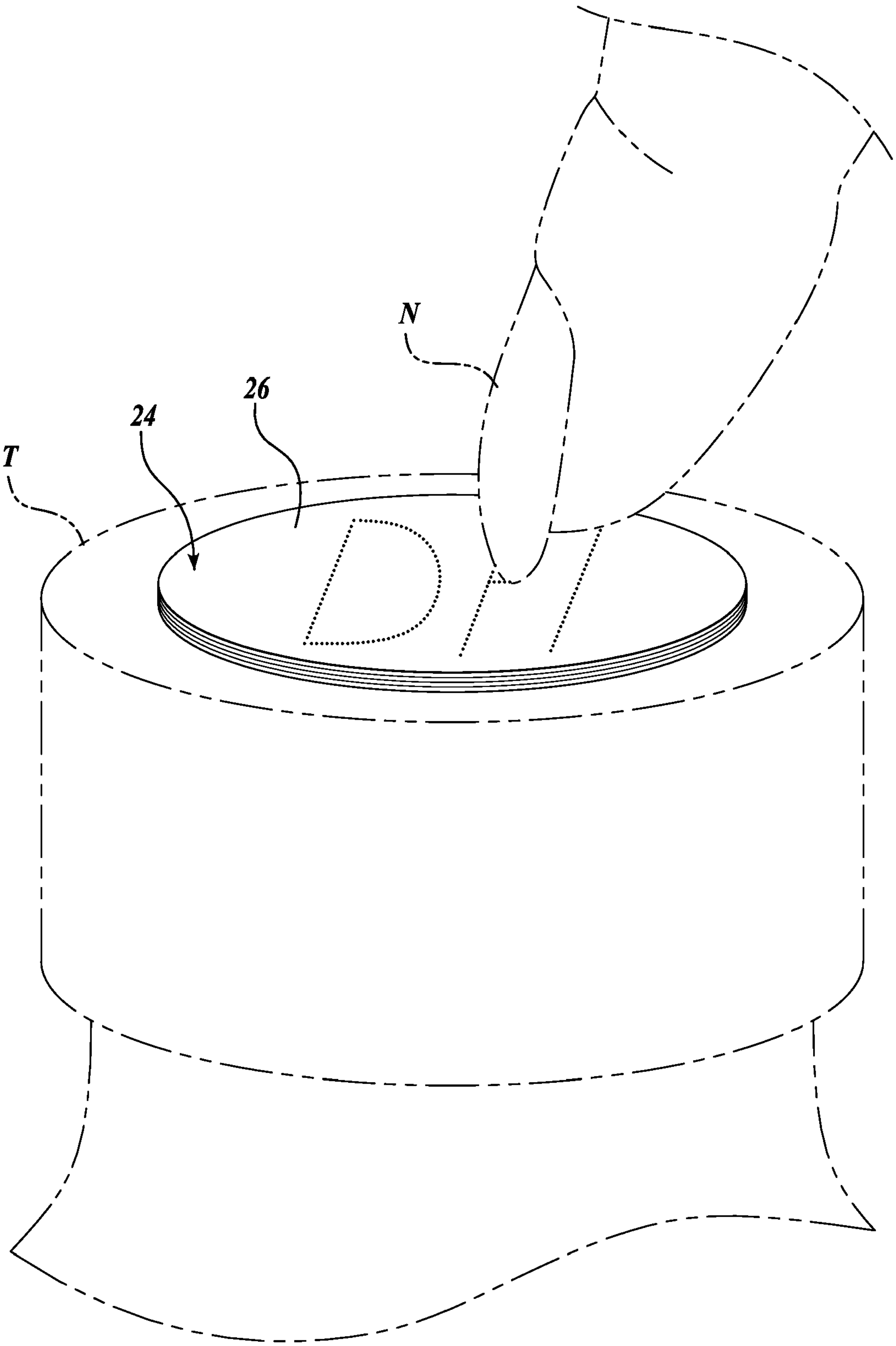
FIG. 5 is an isometric view of the container identification device of FIG. 1, wherein a user is inscribing a marking on the container identification device with a fingernail.

After securing the container identification device 10 to the container C, the protective top layer 44 is peeled away from the remaining layers to reveal the secondary layer 24, as shown in FIG. 4. Referring to FIG. 5, the secondary layer 24 is exposed so that the consumer can make an impression thereon with a rigid device, such as with his or her fingernail N. An appropriate impression is made on the secondary layer 24 to distinguish and/or identify the owner, contents, etc. of the container C.

Figure 6:
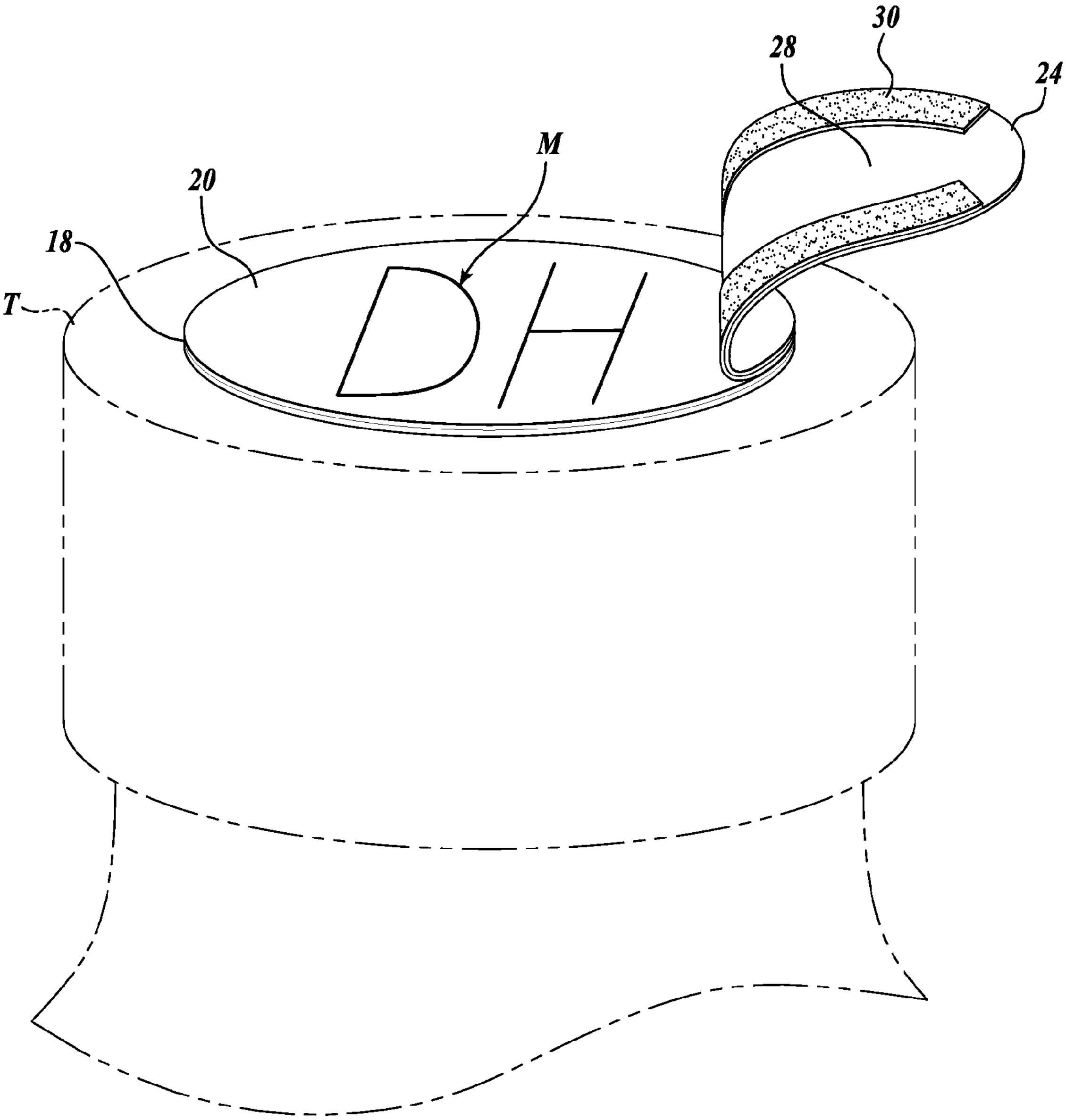
FIG. 6 is an isometric view of the container identification device of FIG. 1, wherein a portion of the container identification device is partially removed to reveal a marking on the container identification device.

Referring now to FIG. 6, the secondary layer 24 is removed after making an impression thereon to reveal a marking M on the top surface 20 of the primary layer 18. Thus, a unique marking M is applied to the container C without the use of a writing utensil. Therefore, the container C can be distinguished from other similar-looking containers in practically any situation.

Figure 7:
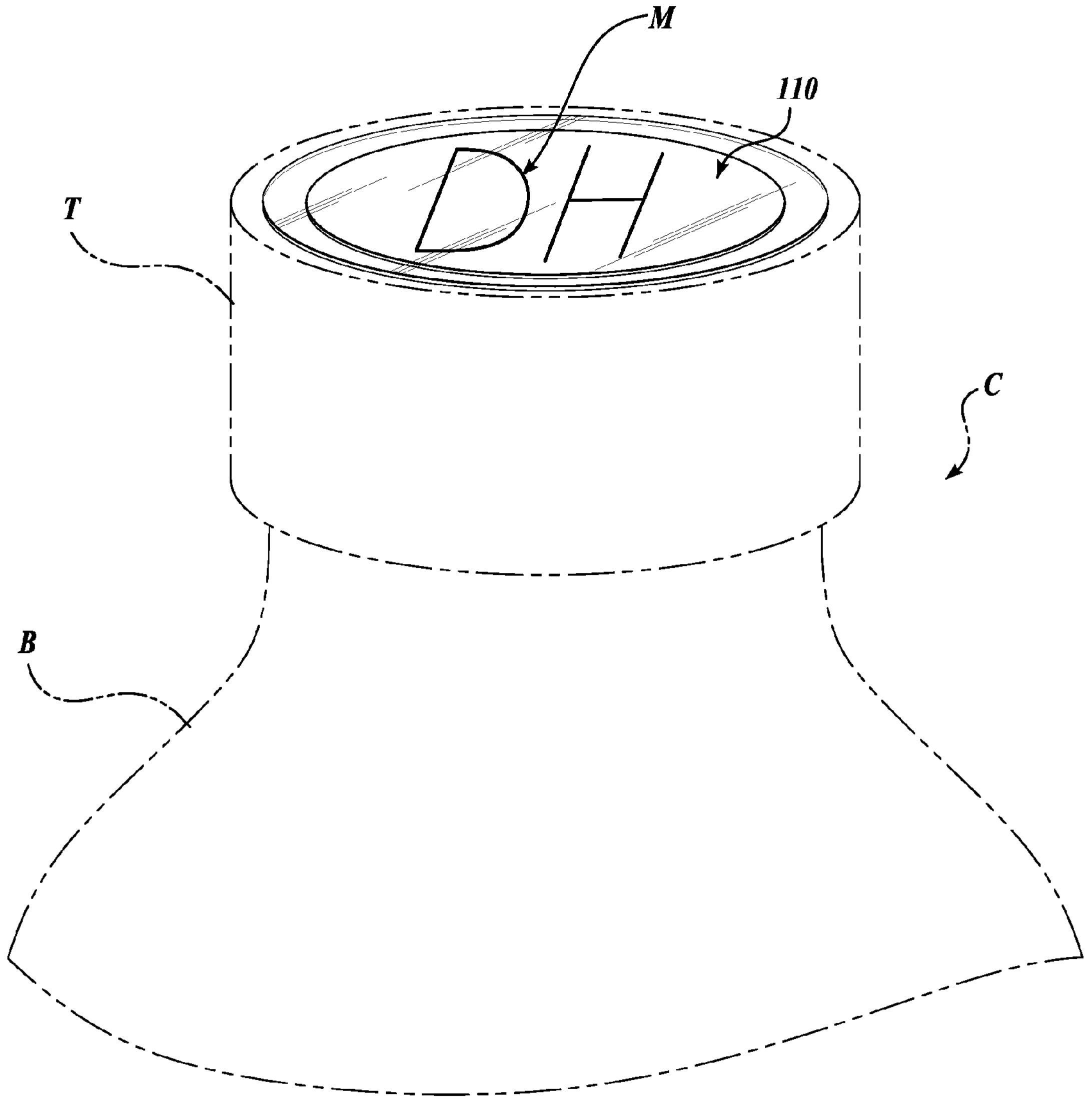
FIG. 7 is an environmental view of a first alternate embodiment of a container identification device constructed in accordance with aspects of the present disclosure, wherein the container identification device is shown secured to a container.
Figure 8:
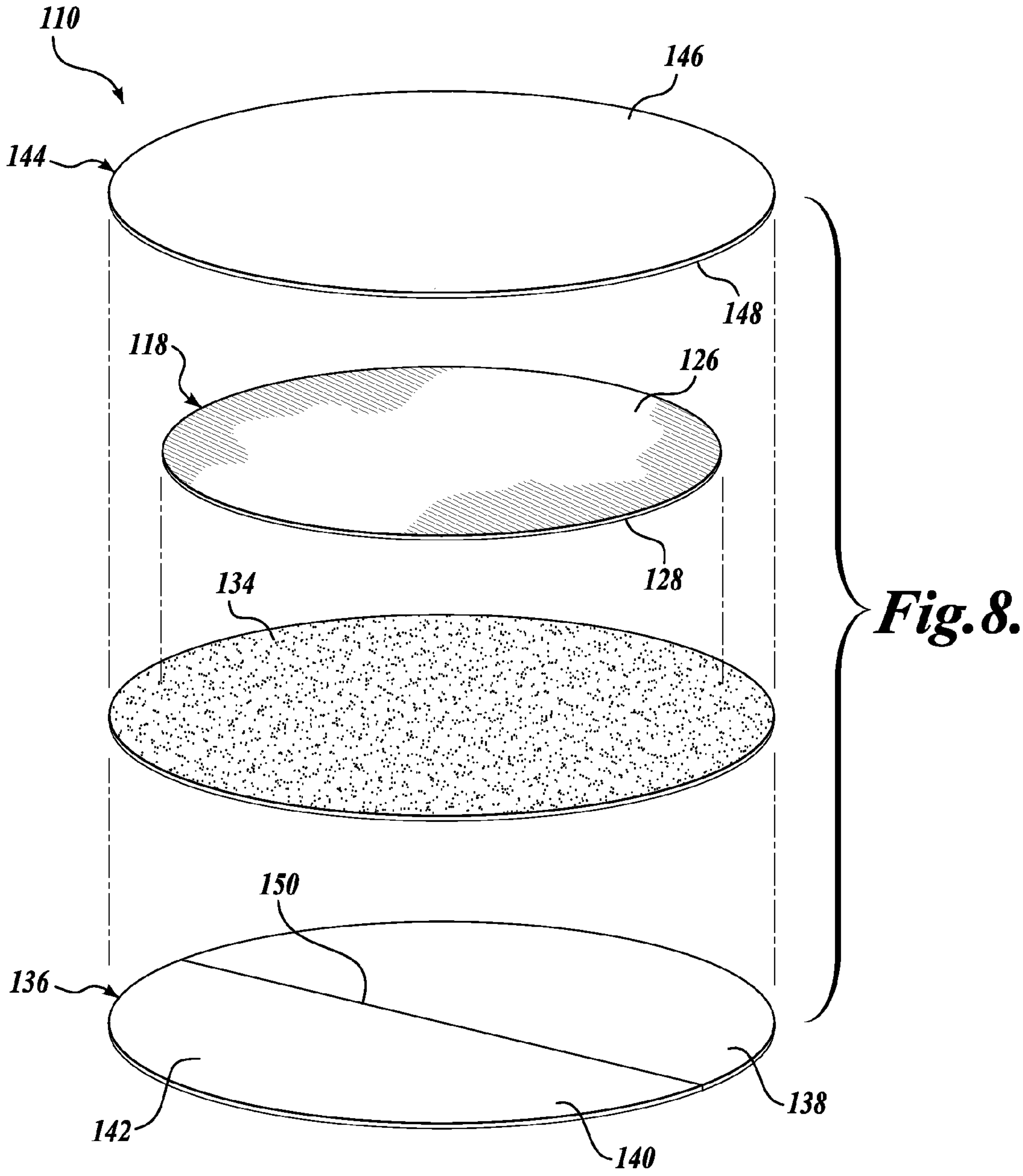
FIG. 8 is an exploded view of the container identification device of FIG. 7.
Figure 9:
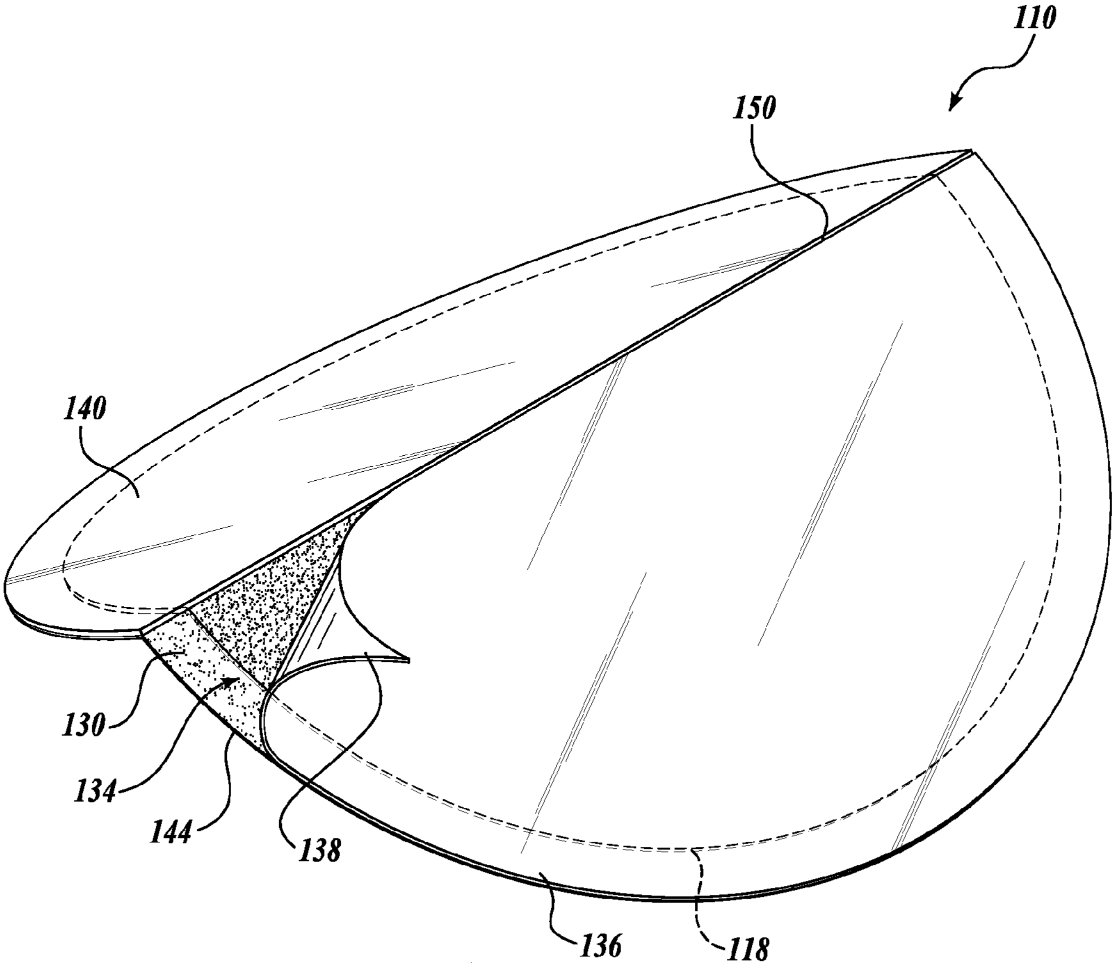
FIG. 9 is an isometric view of the container identification device of FIG. 7 (inverted), wherein a portion of the container identification device is being partially removed.

Referring to FIGS. 7-9 depict an alternative embodiment of a container identification device 110. The container identification device 110 is similar in structure and operation to the container identification device 10 described above except for the differences hereinafter described.

Referring to FIGS. 7 and 8, the container identification device 110 is comprised of a plurality of layers secured together to cooperatively define the container identification device 110. Preferably, each layer is substantially circular and sized to fit on the top T of a container C, such as the bottle B shown in FIG. 7. However, other shapes and sizes may also be appreciated. Moreover, although the container identification device is shown secured on the top T of a bottle B, it should be understood that the container identification device 110 may instead be used with any suitable container or other device requiring identification or labeling.

The container identification device 110 includes a marking layer, or a carbonless paper layer 118 having a top surface 126 and a bottom surface 128. The carbonless paper layer 118 is a one-sheet carbonless system formed by well known methods in the art, wherein the top surface 126 defines the marking side of the carbonless paper. For instance, the top surface 126 may be coated with both a micro-encapsulate dye or ink and a reactive clay such that when an impression is made on the top surface 126 with a rigid instrument, the pressure from the rigid instrument causes the clay to react with the dye to form a permanent mark on the top surface 126. It should be appreciated that any other suitable carbonless paper technologies or other marking technologies may instead be used.

The carbonless paper layer 118 is sandwiched between a protective top layer 144 and a double-sided adhesive layer 134. The protective top layer 144 is preferably formed with a water-proof or water-resistant material, such as plastic. The protective top layer 144 is at least somewhat transparent such that the carbonless paper layer 118 is visible when positioned beneath the protective top layer 144. Moreover, the protective top layer 144 is sufficiently thick to protect the carbonless paper layer 118; however, the protective top layer 144 is also sufficiently thin and pliable to allow a user to make an impression on the carbonless paper layer 118 through the protective layer 144. In this manner, the user can create a marking on the carbonless paper layer 118 without removing the protective top layer 144. However, it should be appreciated that the protective top layer 144 may instead be either removable or eliminated from the container identification device 110 such that the user can make a mark directly on the carbonless paper layer 118.

The protective top layer 144 is sized and shaped to engage and cover the top surface 126 of the carbonless paper layer 118. Preferably, the protective top layer 144 is sufficiently large such that the protective top layer 144 extends radially outwardly from the outer circumference of the carbonless paper layer 118 to define a circumferential edge portion 130 (see FIG. 9). The carbonless paper layer 118 is preferably positioned concentrically beneath the protective top layer 144 so as to define a circumferential edge portion 130 having a substantially constant radial thickness. The circumferential edge portion 130 provides a sealing edge when the container identification device 110 is secured to a container C to seal the carbonless paper layer 118 beneath the protective top layer 144.

The double-sided adhesive layer 134 is preferably substantially the same size and shape as the protective top layer 144. The double-sided adhesive layer 134 is applied to the bottom surface 128 of the carbonless paper layer 118 and to the bottom surface 148 of the protective top layer 144 along the circumferential edge portion 130. As such, the double-sided adhesive layer 134 secures the carbonless paper layer 118 to the protective top layer 144. However, it should be appreciated that the carbonless paper layer 118 may instead be secured to the protective top layer 144 in any other suitable manner, such as with a separate adhesive. The double-sided adhesive layer 134 may be applied to the bottom surface 128 of the carbonless paper layer 118 and the bottom surface 148 of the protective top layer 144 in any suitable manner, such as by calendaring, coating, etc. Moreover, the double-sided adhesive layer 134 may instead be a sheet of double-sided adhesive tape or paper that is secured to both the carbonless paper layer 118 and the protective top layer 144.

The carbonless paper layer 118 and protective top layer 144 are securable to the container C or to any suitable medium through the adhesive layer 134. Thus, the adhesive layer 134 is preferably a permanent, pressure sensitive, low tack conventional adhesive that permanently secures two materials together, such as epoxy, polyurethane, neoprene, nitrile, and silicone. The adhesive layer 134 may have an adequate shear strength and moisture resistance such that the carbonless paper layer 118 and the protective top layer 144 permanently adhere to the container C, even if the container C is wet (for example, if it is being stored within a cooler having ice). Moreover, the adhesive layer 134 includes sufficient moisture resistance such that the carbonless paper layer 118 does not get wet when the container is submersed in liquid for a reasonable period of time (such as, for example, 4 hours). In the alternative, the adhesive layer 134 may consist only of a satisfactory amount of adhesive such that the adhesive provides adequate shear strength to prevent the carbonless paper layer 118 and top layer 144 from easily separating from the container C. With the identification device 110 secured to the top T, the carbonless paper layer 118 is sealed beneath the protective top layer 144 and protected from water damage or other damage.

Referring to FIGS. 8 and 9, the container identification device 110 includes an optional protective peelable backing 136 that is temporarily secured to the adhesive layer 134 to protect the adhesive layer 134 from dirt or moisture prior to application. The peelable backing 136 includes a release coating, such as silicon or wax, on its top surface 142 such that the peelable backing 136 is removable from the permanent adhesive layer 134.

The peelable backing 136 is preferably the same size and shape as the adhesive layer 134 and the protective top layer 144. In this manner, the container identification device 110 can be individually distributed to consumers separately from the container C. The peelable backing 136 is cut or otherwise separated into first and second portions 138 and 140 to define a separation or seam 150 therebetween. The container identification device 110 can be bent about the seam 150 to at least partially separate the peelable backing 136 from the adhesive layer 134 near the seam 150 and allow for easy removal of the first and second portions 138 and 140 from the adhesive layer 134.

It should be appreciated that the peelable backing 136 may instead be slightly larger than the remaining layers of the container identification device 110 to define a radially extending edge portion (not shown). The peelable backing 136 could be peeled away from the remaining layers at the edge portion when the container identification device 110 is ready to be used. In this case, the seam 150 would not be necessary. In the alternative, the peelable backing 136 may be a sheet or strip that temporarily holds a plurality of container identification devices 110 thereon. In this manner, a large number of container identification devices 110 can be sent, for instance, to the container manufacturer such that the container identification devices 110 can be secured to containers C prior to their shipment to the consumer or retailer.

In use, the container identification device 110 is first secured to the container C either by the consumer or at the container manufacturer prior to its shipment to the retailer or consumer. To secure the container identification device 110 to the container C, the peelable backing 136 is peeled away from the remaining layers to reveal the adhesive layer 134 on the bottom surfaces 128 and 148 of the carbonless paper layer 118 and the protective top layer 144 (if the peelable backing 136 is used). The container identification device 110 is then secured to the container C in any suitable location, such as on the top T, through the adhesive layer 134 (see FIG. 7).

After securing the container identification device 110 to the container C, an appropriate impression is made on the protective top layer 144 with a rigid instrument, such as with a fingernail, to distinguish and/or identify the owner, contents, etc., of the container C. Thus, a unique marking M is applied to the container C without the use of a writing utensil. Therefore, the container C can be distinguished from other similar-looking containers in practically any situation.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A container identification device, consisting of:

(a) a protective top layer having a top surface and a bottom surface;

(b) a marking layer having a top surface and a bottom surface, the top surface of the marking layer directly engageable with the bottom surface of the protective top layer, wherein a mark is made on the marking layer when a corresponding impression is made on the protective top layer, and wherein the marking layer is smaller in size than the protective top layer such that a circumferential edge portion is defined by the protective top layer when the marking layer is positioned beneath the protective top layer; and (c) an adhesive layer substantially the same size and shape as the protective top layer, the adhesive layer secured to the bottom surface of the marking layer and the bottom surface of the circumferential edge portion of the protective top layer.

2. The container identification device of claim 1, wherein the marking layer is a carbonless paper layer.

3. The container identification device of claim 1, wherein the protective top layer seals the marking layer beneath the protective top layer when the identification device is secured to a container.

4. The container identification device of claim 1, wherein the protective top layer is water-resistant.

5. The container identification device of claim 1, wherein the container identification device is sized and configured to fit on a cap of a bottle.

6. A container identification device, consisting of:

(a) a water-resistant top layer having a top surface and a bottom surface;

(b) a carbonless paper layer having a top surface and a bottom surface, the top surface of the carbonless paper layer directly engageable with the bottom surface of the water-resistant top layer, wherein a mark is made on the carbonless paper layer when a corresponding impression is made on the water-resistant top layer, and wherein the carbonless paper layer is smaller in size than the water-resistant top layer such that a circumferential edge portion is defined by the water-resistant top layer when the carbonless paper layer is positioned beneath the water-resistant top layer; and (c) an adhesive layer substantially the same size and shape as the water-resistant top layer, the adhesive layer secured to the bottom surface of the carbonless paper layer and the bottom surface of the circumferential edge portion of the water-resistant top layer.

7. The container identification device of claim 6, wherein the water-resistant top layer seals the carbonless paper layer beneath the water-resistant top layer when the identification device is secured to a container.

8. The container identification device of claim 6, wherein the container identification device is sized and configured to fit on a cap of a bottle.

9. A container identification device, consisting of:

(a) a protective top layer having a top surface and a bottom surface;

(b) a marking layer having a top surface and a bottom surface, the top surface of the marking layer directly engageable with the bottom surface of the protective top layer, wherein a mark is made on the marking layer when a corresponding impression is made on the protective top layer, and wherein the marking layer is smaller in size than the protective top layer such that a circumferential edge portion is defined by the protective top layer when the marking layer is positioned beneath the protective top layer;

(c) an adhesive layer substantially the same size and shape as the protective top layer, the adhesive layer secured to the bottom surface of the marking layer and the bottom surface of the circumferential edge portion of the protective top layer; and (d) a peelable backing releasably secured to the adhesive layer.

10. The container identification device of claim 9. wherein the peelable backing is separated into first and second portions to define a seam between the first and second portions.

11. The container identification device of claim 10, wherein the container identification device is bendable about the seam to at least partially separate the first and second portions of the peelable backing from the adhesive.

* * * * *